T. G. KUS.
FAUCET.
APPLICATION FILED JUNE 14, 1909.
954,744.
Patented Apr. 12, 1910.
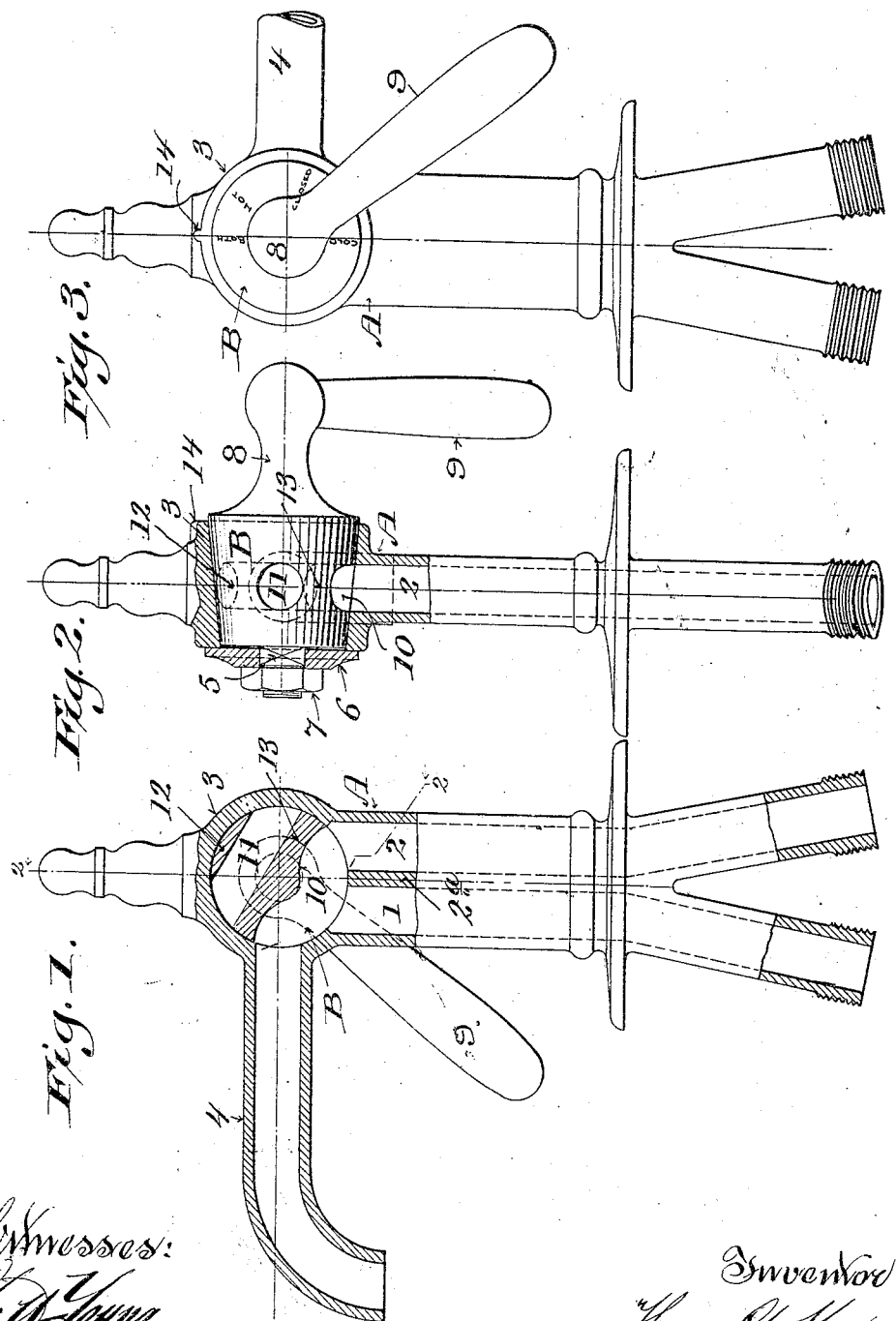

UNITED STATES PATENT OFFICE.

THOMAS G. KUS, OF MILWAUKEE, WISCONSIN.

FAUCET.

954,744.

Specification of Letters Patent.   Patented Apr. 12, 1910.

Application filed June 14, 1909. Serial No. 502,171.

*To all whom it may concern:*

Be it known that I, THOMAS G. KUS, a citizen of the United States, residing at Milwaukee, in the county of Milwaukee and State of Wisconsin, have invented certain new and useful Improvements in Faucets, of which the following is a specification.

The object of my invention is to provide a simple, durable and economical combination hot-and-cold water faucet, its construction and arrangement being such that with a movement of approximately one-half revolution of the valve-plug the water-supply is completely controlled in such manner that water at the two extremes or any intermediate degrees of temperature may be had or the water may be entirely cut off depending upon predetermined fixed movements of the valve, which movements are properly indicated by a fixed pointer in conjunction with suitable inscriptions radially disposed about one end of the valve-plug.

The invention therefore consists in certain peculiarities of construction and combination of parts as fully set forth hereinafter with reference to the accompanying drawings and subsequently claimed.

In the drawings: Figure 1 represents a side elevation of a faucet embodying the features of my invention, parts being broken away and parts in section to better illustrate the details of the invention; Fig. 2, a rear elevation of the same partly in section, as indicated by line 2—2 of Fig. 1, and Fig. 3, a side elevation of the faucet looking from the reverse direction from that shown in Fig. 1.

Referring by characters to the drawings, A indicates a one-piece valve-body, the standard of which is provided with separate vertically disposed hot and cold water channels 1 and 2 respectively, which channels are separated by a division-wall 2ª and extend below the base-portion of the body in the form of separate branch-pipes for suitable hot and cold water pipe-connections. The channels 1 and 2 of the valve-body communicate with a horizontally disposed cylinder head 3 having inner tapered walls, the head being provided with a discharge nozzle 4, which nozzle is set at a right-angle to the water channels. The tapered walls of the head 3 are arranged to receive a corresponding tapered plug B having a squared shank 5 at its smaller end, upon which shank is mounted a washer 6, the washer being adapted to overlap the adjacent end of the head. The shank terminates with a screw-thread end for the reception of a clamping-nut 7, which nut in connection with the washer serves to draw the plug firmly to its seat. The opposite end of the plug B has a stem extension 8 that forms the base of a handle 9, which handle projects therefrom at a right-angle, as best shown in Fig. 2.

The plug thus described constitutes a valve-closure, whereby the discharge-nozzle as well as the hot and cold water-supply channels are controlled, said plug being provided with transverse ports 10 and 11 extending therethrough and arranged to be moved in and out of register with the aforesaid nozzle and channels. The port 10 is disposed parallel to the port 11 and interrupts the exterior tapered surface of the plug, said port serving as a connection either between the nozzle aperture and hot water channel 1 or the combined hot and cold water channels depending upon its position relative thereto. Port 11 communicates with the discharge nozzle and cold water channel only, the latter port being arranged entirely within the plug as shown, whereby an exterior bridge-piece 12 of the circumferential face of the plug is left intact. This bridge-piece 12 is of sufficient length in proportion to the nozzle aperture and hot water channel to serve as a closure for either, thus if said bridge-piece is moved across the hot water channel 1, the port 11 will register with the nozzle aperture and cold water channel, and if moved across the nozzle aperture, the aforesaid bridge-piece serves as a closure for the faucet against flow of water from either source, it being understood that when the valve is in its closed position, the wall 13 between the ports is vertically disposed or alined with the division-wall 2ª, whereby communication between the hot and cold water channels is cut off.

That end of the plug from which the stem projects is preferably provided with the words "Cold," "Closed," "Hot," and "Both." These words are raised or otherwise affixed upon the surface and radially disposed to the plug axis, being spaced at equal distance apart and covering a combined distance of one-half the circumference of said plug, as clearly shown in Fig. 3. These arbitrarily selected words are set with relation to the valve ports and a fixed indicator-point 14 extending from the head, so that when the plug is rotated to cause registration between any one of said words and the indicator-point, water either hot, cold or having an intermediate temperature can be had or the supply can be closed off entirely.

While I have shown the faucet as being provided with a curved nozzle, the shape of the same as well as the valve body may be varied to suit its application to tubs, sinks, basins or the like.

I claim:

1. A valve comprising a body-portion having a tapered cylindrical head, a nozzle having its aperture in communication with the head, a pair of water-supply channels extending through the body in communication with said head, the supply channels being upon the same plane as the nozzle aperture and disposed at approximately a right-angle thereto, a tapered plug fitted into the head, a transversely disposed port extending through the plug, and a second transversely disposed port interrupting the exterior surface of said plug, the ports being approximately parallel and upon the same plane as the nozzle and channels aforesaid.

2. A valve comprising a one-piece body-portion having a tapered cylindrical head, a nozzle having its aperture in connection with the head, a pair of parallel water-supply channels extending through the body-portion in communication with said head and disposed at a right-angle to the nozzle aperture, the supply-channels and nozzle aperture being upon the same plane, a tapered plug fitted into the tapered head, the tapered plug being provided with an exterior port and second port extending therethrough, the exterior port being arranged to form a passage from the channels collectively or individually to the nozzle, the other port being arranged to form a passage between one of said channels and said nozzle, a bridge-piece carried by the plug constituting a closure for the nozzle aperture or one of the channels, a fixed pointer in connection with the valve body, and a series of designations disposed about one end of the plug adapted to be brought into register with the pointer to indicate various temperatures of water supplied from the channels.

THOMAS G. KUS.

Witnesses:
ARTHUR KELLERMAN,
BREWER A. DENT.